(12) United States Patent
Nomura

(10) Patent No.: US 9,995,252 B2
(45) Date of Patent: Jun. 12, 2018

(54) INTAKE MANIFOLD FOR INTERNAL COMBUSTION ENGINE

(71) Applicant: TOYOTA BOSHOKU KABUSHIKI KAISHA, Aichi-ken (JP)

(72) Inventor: Takeshi Nomura, Chiryu (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 222 days.

(21) Appl. No.: 14/625,241

(22) Filed: Feb. 18, 2015

(65) Prior Publication Data

US 2015/0240762 A1 Aug. 27, 2015

(30) Foreign Application Priority Data

Feb. 21, 2014 (JP) ................. 2014-031601

(51) Int. Cl.
*F02M 35/10* (2006.01)
*F02M 35/104* (2006.01)
*F02M 35/108* (2006.01)
*F02B 31/06* (2006.01)

(52) U.S. Cl.
CPC ....... *F02M 35/10118* (2013.01); *F02B 31/06* (2013.01); *F02M 35/104* (2013.01); *F02M 35/108* (2013.01); *F02M 35/10262* (2013.01); *F02B 2275/48* (2013.01);
(Continued)

(58) Field of Classification Search
CPC ....... F02M 35/10255; F02M 35/10085; F02M 35/104; F02M 35/10118; F02M 35/1222; F02M 35/10144; F02M 35/10354; F02M 35/10386; F02M 35/10; F02M 35/10072; F02M 35/1277; F02M 35/1283

USPC ........... 123/184.21, 184.24–184.27, 184.37, 123/184.55, 184.56, 184.59, 184.52
See application file for complete search history.

(56) References Cited

U.S. PATENT DOCUMENTS 6,298,816 B1 * 10/2001 Marentette ....... F02M 35/10019
123/184.57
7,121,246 B2 * 10/2006 Uchiyama ............... F02B 31/06
123/184.42
(Continued)

FOREIGN PATENT DOCUMENTS

| JP | 2007-002810 | 1/2007 |
| JP | 2008-190331 | 8/2008 |
| JP | 2009-002218 | 1/2009 |

OTHER PUBLICATIONS

Japanese Office Action for JP App. No. 2014-031601 dated Mar. 28, 2017, along with English-language translation thereof.

*Primary Examiner* — Long T Tran
(74) *Attorney, Agent, or Firm* — Greenblum & Bernstein, P.L.C.

(57) ABSTRACT

An intake manifold for an internal combustion engine includes branch pipes, each of which is connected to one of intake ports and has an intake passage, valve cases, each of which is provided to one of the branch pipes and connected to the corresponding intake port, branch pipe bodies, each of which is connected to the upstream end of one of the valve cases, valves, each of which is provided in one of the valve cases to change the cross-sectional area of the intake passage of the corresponding branch pipe, and a coupling portion, which is located between downstream ends of each adjacent pair of the branch pipe bodies to couple the downstream ends to each other.

4 Claims, 3 Drawing Sheets

(52) U.S. Cl.
CPC ...... *F02M 35/10321* (2013.01); *Y02T 10/125* (2013.01); *Y02T 10/146* (2013.01)

(56) References Cited

U.S. PATENT DOCUMENTS

| | | | |
|---|---|---|---|
| 8,118,007 B2 * | 2/2012 | Sano | F02B 31/06 123/184.55 |
| 8,511,289 B2 * | 8/2013 | Tanikawa | F02M 35/10039 123/184.42 |
| 8,590,501 B1 * | 11/2013 | Kim | F02B 27/0263 123/184.21 |
| 2005/0034702 A1 * | 2/2005 | Uchiyama | F02B 31/06 123/306 |
| 2010/0294227 A1 * | 11/2010 | Magnan | F02B 31/085 123/184.55 |

* cited by examiner

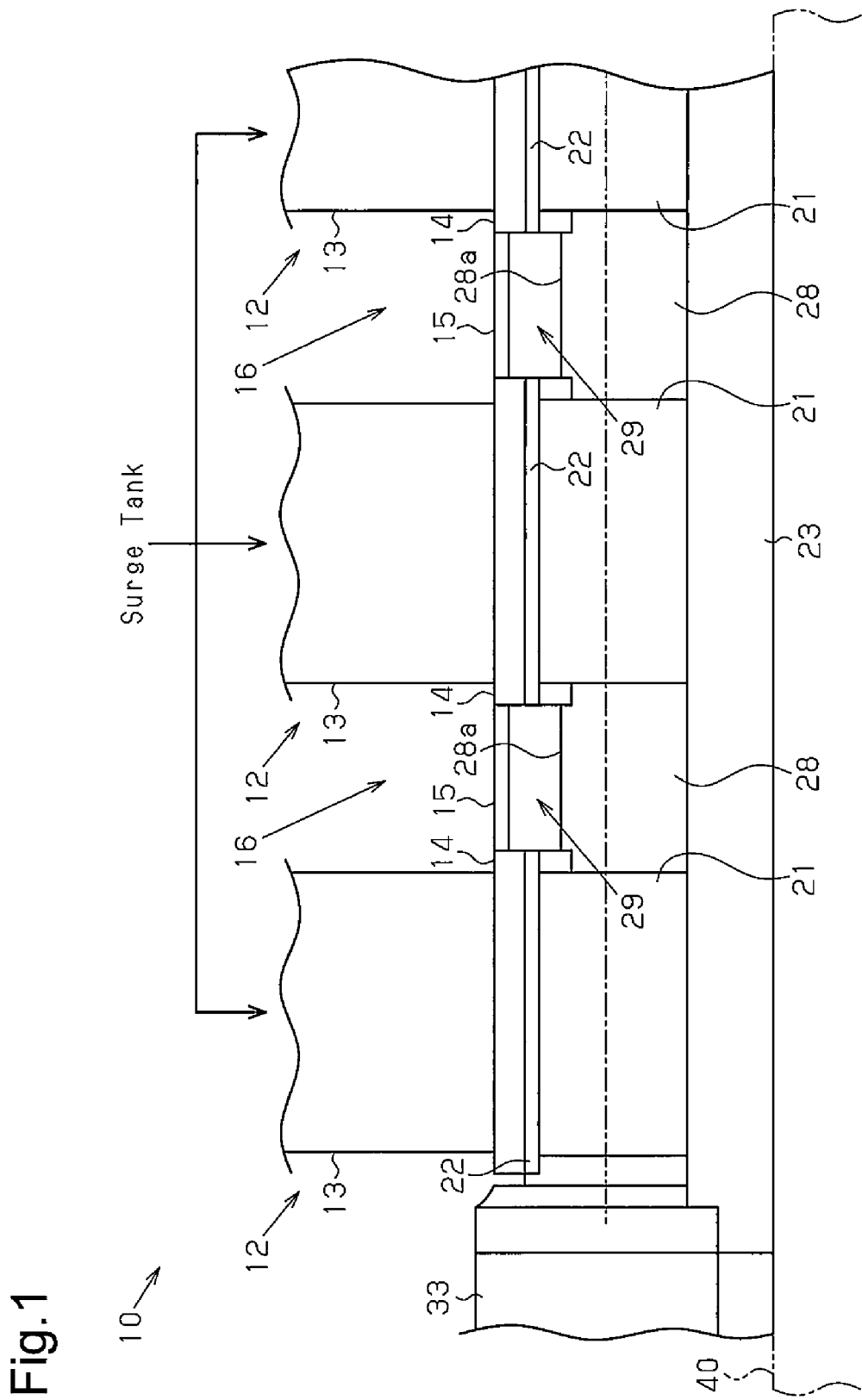

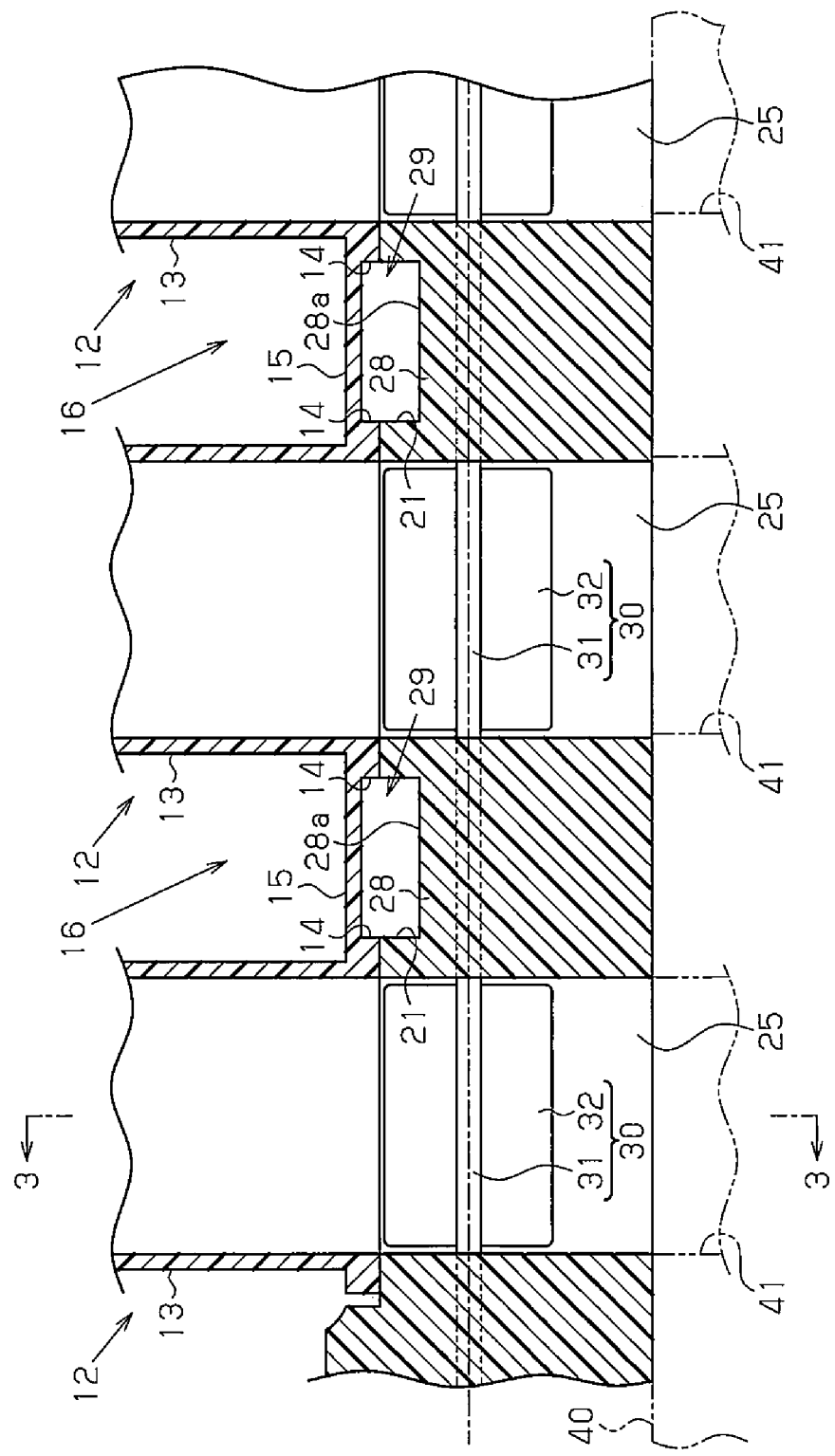

INTAKE MANIFOLD FOR INTERNAL COMBUSTION ENGINE

BACKGROUND OF THE INVENTION

The present invention relates to an intake manifold that has branch pipes connected to the intake ports of the cylinder head of an internal combustion engine.

Some of such intake manifolds include valves each provided at the downstream end of a branch pipe to change the cross-sectional area of the intake passage (refer to Japanese Laid-Open Patent Publication No. 2009-2218). The intake manifold of the document changes the opening degree of the valves to change the cross-sectional area of each intake passage, thereby generating tumble flows in the combustion chambers. Such intake manifolds are often made of heat resistant plastic.

During operation of an engine, the cylinder head is heated to high temperatures and the heat is transferred to the intake manifold from the cylinder head, which thermally expands the branch pipes. In an intake manifold having valves at the downstream ends of the branch pipes to change the cross-sectional area of each intake passage, thermal expansion of each branch pipe may cause its inner wall to interfere with the valve. Conventionally, the clearance between the branch pipe inner wall and the valve is designed to be large with some margin to avoid interference between the inner wall and the valve. However, such a clearance tends to be unnecessarily large even when the branch pipe is relatively cold and not significantly expanded due to heat. In this case, even when the valve is closed, the clearance is likely to cause leakage of intake air therethrough. It is thus difficult to change the intake air flow in a favorable manner, and desired tumble flows may fail to be created.

SUMMARY OF INVENTION

Accordingly, it is an objective of the present invention to provide an intake manifold capable of effectively changing flow of intake air.

To achieve the foregoing objective and in accordance with one aspect of the present invention, an intake manifold for an internal combustion engine is provided. The intake manifold is connected to a plurality of intake ports of a cylinder head. The intake manifold includes a plurality of branch pipes, each of which is connected to one of the intake ports and has an intake passage, a plurality of valve cases, each of which is provided to one of the branch pipes and connected to the corresponding intake port, a plurality of branch pipe bodies, each of which is connected to an upstream end of one of the valve cases, a plurality of valves, each of which is provided in one of the valve cases to change a cross-sectional area of the intake passage of the corresponding branch pipe, and a coupling portion, which is located between downstream ends of each adjacent pair of the branch pipe bodies to couple the downstream ends to each other.

Since a valve case is located between each branch pipe body and the cylinder head, the temperature of the branch pipe body is lower than that of the valve case when heat is transferred from the cylinder head to the branch pipe body.

In the above described configuration, since a coupling portion is provided between the downstream ends of each adjacent pair of the branch pipe bodies to couple the downstream ends to each other, the downstream end of each branch pipe body is restrained from being deformed through thermal expansion. This in turn restrains deformation of the valve case connected to the branch pipe body. It is thus possible to reduce the clearance between the valve case inner wall and the valve, while avoiding interference between the valve case and the valve. This restrains intake air leakage through the clearance.

BRIEF DESCRIPTION OF THE DRAWINGS

FIG. 1 is a side view of an intake manifold according to one embodiment, showing the side structure of downstream ends of branch pipes;

FIG. 2 is a cross-sectional view of the intake manifold of FIG. 1, showing the cross-sectional structure of the downstream ends of the branch pipes;

DETAILED DESCRIPTION OF THE PREFERRED EMBODIMENTS

Figures 3A, 3B:
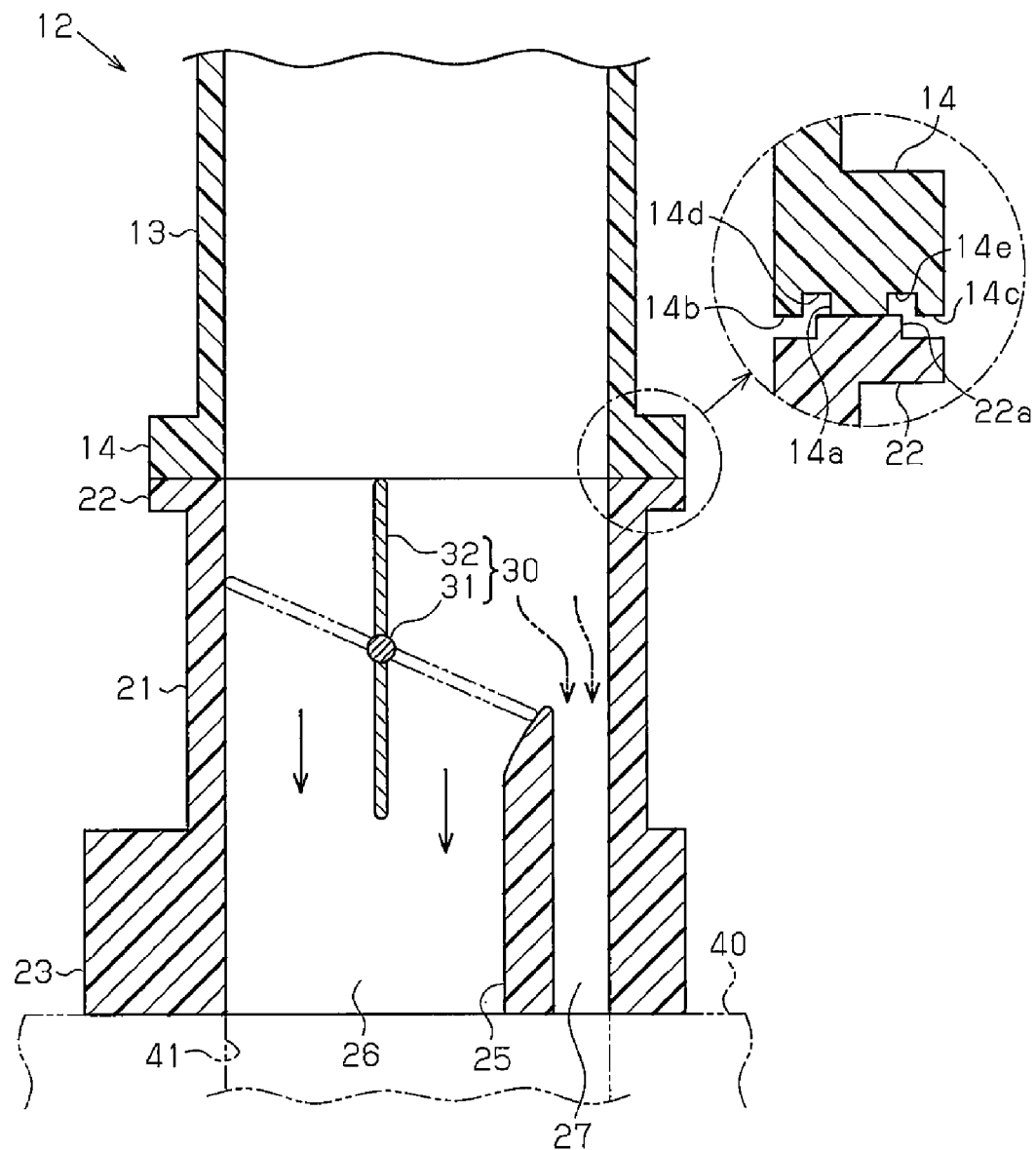
FIG. 3A is a cross-sectional view taken along line 3-3 of FIG. 2.
FIG. 3B is an enlarged cross-sectional side view illustrating a joint part of FIG. 3A.

An intake manifold according to one embodiment of the present invention will now be described with reference to FIGS. 1 to 3B. The intake manifold is employed in an inline three-cylinder internal combustion engine. In the present embodiment, the upstream side and the downstream side in the flowing direction of intake air will be simply referred to as an upstream side and a downstream side.

As shown in FIGS. 1 and 2, the intake manifold of the present embodiment includes a manifold main body 10, which is made of a heat resistant plastic such as a polyamide plastic. The manifold main body 10 includes a surge tank and branch pipes 12 that branch from the surge tank.

As shown in FIGS. 2 and 3A, the downstream end of each branch pipe 12 is connected to one of intake ports 41 of a cylinder head 40 of an internal combustion engine.

Intake air that has been filtered by an air cleaner (not shown) is supplied to the interior of the surge tank via an intake duct (not shown). The intake air in the surge tank is supplied to the combustion chambers via the branch pipes 12 and the intake ports 41.

As shown in FIGS. 1 to 3A, each branch pipe 12 includes a branch pipe body 13, which forms a part of the manifold main body 10, and a valve case 21, which is located on the downstream side of the branch pipe body 13. The valve cases 21 are made of the same material as that of the manifold main body 10. The material may be a heat resistant plastic such as a polyamide plastic.

As shown in FIGS. 1 and 2, a case coupling portion 28 is located between each adjacent pair of the valve cases 21. The case coupling portion 28 is formed integrally with the valve cases 21 to couple the valve cases 21 to each other.

A downstream-side flange 23 is formed integrally with the downstream ends of the valve cases 21 and the case coupling portions 28. The downstream-side flange 23 has through holes (not shown), through which bolts are inserted to fix the intake manifold to the cylinder head 40.

Each valve case 21 has an upstream-side flange 22 at the outer periphery of the upstream end. Also, each branch pipe body 13 has a flange 14, which is located at the outer periphery of the downstream end and corresponds to the upstream-side flange 22 of the corresponding valve case 21.

As illustrated in an enlarged manner in FIG. 3B, the upstream-side flange 22 has on its top a protrusion 22a, which serves as a welding portion. The flange 14 has on its bottom a protrusion 14a, which serves as a welding portion.

The width of the welding portion of the protrusion 14a is smaller than the width of the welding portion of the protrusion 22a. The flange 14 has on its bottom an inner circumferential protrusion 14b and an outer circumferential protrusion 14c, which are separated radially inward and outward of the protrusion 14a, respectively. Grooves 14d, 14e are formed between the protrusion 14a and the inner circumferential protrusion 14b and between the protrusion 14a and the outer circumferential protrusion 14c, respectively.

The protrusion 22a of the valve case 21 and the protrusions 14a of the branch pipe body 13 are joined to each other by vibration-welding.

As shown in FIGS. 1 and 2, a coupling portion 15 is located between the flanges 14 of each adjacent pair of the branch pipe bodies 13. The coupling portion 15 is formed integrally with the flanges 14 to couple the flanges 14 to each other. The coupling portions 15 are formed like flat plates extending along the downstream end faces of the branch pipes 13. A clearance 16 is formed between each adjacent pair of the branch pipe bodies 13 at a position of the branch pipe bodies 13 that is upstream of the parts coupled to the corresponding coupling portion 15.

As shown in FIG. 3A, each valve case 21 has a partition wall 25, which divides the inner passage of the valve case 21. Specifically, the partition wall 25 divides the inner passage of the valve case 21 into a main passage 26 and an auxiliary passage 27. The cross-sectional area of the auxiliary passage 27 is set to be smaller than the cross-sectional area of the main passage 26.

As shown in FIGS. 2 and 3A, each valve case 21 has a control valve 30 installed therein. The control valve 30 is capable of changing the cross-sectional area of the intake passage to change the flow of intake air. As illustrated in FIG. 2, the valve cases 21 and the case coupling portions 28 rotationally support a common valve shaft 31, which extends through the valve cases 21 and the case coupling portions 28. Also, as shown in FIGS. 1 and 2, the case coupling portions 28 are separated from the coupling portions 15 so that a space 29 is formed between an end face 28a of each case coupling portion 28 and the corresponding coupling portion 15.

As shown in FIG. 3A, plate-like valve members 32 are fixed to the valve shaft 31 such that each valve member 32 can open and close the corresponding main passage 26. As shown in FIG. 1, one end of the valve shaft 31 is connected to an actuator 33, which is, for example, a motor.

Operation of the present embodiment will now be described.

In the intake manifold of the present embodiment, the actuator 33 rotates the valve shaft 31, so that each valve member 32 is switched between a position for opening the main passage 26 and a position for closing the main passage 26, as indicated by solid lines and long dashed double-short dashed lines in FIG. 3A. When the engine is operating with a low flow rate of intake air, the valve member 32 closes the main passage 26, so that most of the intake air flows through the auxiliary passage 27. This generates effective tumble flow in the combustion chamber.

Since the valve case 21 is located between each branch pipe body 13 and the cylinder head 40, the temperature of the branch pipe body 13 is lower than that of the valve case 21 even if heat is transferred from the cylinder head 40 to the branch pipe body 13.

According to the intake manifold of the present embodiment, the flanges 14 of each adjacent pair of the branch pipe bodies 13 are coupled to each other by the corresponding coupling portion 15 formed between the flanges 14. This restrains each branch pipe body 13 from being deformed due to thermal expansion. Since the branch pipe bodies 13 are restrained from being deformed due to thermal expansion, the valve cases 21, which are joined to the branch pipes 13, are restrained from being deformed leftward or rightward as viewed in FIGS. 1 and 2. It is thus possible to reduce the clearance between the inner wall of each valve case 21 and the valve member 32 of the corresponding control valve 30, while avoiding interference between the valve case 21 and the valve member 32. This restrains intake air leakage through the clearance.

The intake manifold for an internal combustion engine according to the above described embodiment has the following advantages.

(1) The branch pipes 12 of the intake manifold for an internal combustion engine each include a valve case 21 connected an intake port 41 and a branch pipe body 13 joined to the upstream end of the valve case 21. The valve case 21 has a control valve 30 that changes the cross-sectional area of the intake passage. A coupling portion 15 is located between flanges 14 of the downstream ends of each adjacent pair of the branch pipe bodies 13. The coupling portion 15 couples the flanges 14 to each other.

This structure restrains deformation of the valve cases 21 as described above, so that the flow of intake air can be effectively changed to increase the flow velocity of the tumble flows in the combustion chambers.

(2) Each coupling portion 15 is coupled onto the flanges 14 provided at the downstream ends of the corresponding branch pipe bodies 13. That is, a clearance 16 is formed between each adjacent pair of the branch pipe bodies 13 at a position of the branch pipe bodies 13 that is upstream of the parts coupled to the corresponding coupling portion 15. This allows the size of the coupling portions 15 to be reduced to minimize the increase in weight due to the addition of the coupling portions 15.

(3) A case coupling portion 28 is located between each adjacent pair of the valve cases 21. The case coupling portion 28 couples the valve cases 21 to each other and is separated from the corresponding coupling portion 15. That is, the coupling portion 15 is separated from the end face 28a of the case coupling portion 28.

This structure provides a space 29 between each coupling portion 15 and the end face 28a of the corresponding case coupling portions 28, so that heat is not directly transferred from the case coupling portion 28 to the coupling portion 15. Also, since the space 29 ensures ventilation between the coupling portion 15 and the case coupling portion 28 to cool the coupling portion 15. This effectively limits deformation of the coupling portion 15 due to thermal expansion. Therefore, each adjacent pair of the branch pipe bodies 13 are restrained from being deformed due to thermal expansion.

(4) The width of the welding portion of the protrusion 14a of each branch pipe body 13 is smaller than the width of the welding portion of the protrusion 22a of the corresponding valve case 21. This restrains the heat of the cylinder head 40 from being transferred to the protrusion 14a of the branch pipe body 13 via the protrusion 22a of the valve case 21. Therefore, the branch pipe bodies 13 and the coupling portions 15 are restrained from being heated and are not deformed due to thermal expansion.

The above embodiment may be modified as follows.

The coupling portions 15 may have holes or fins for radiating heat.

Each coupling portion 15 may be extended to a position upstream of the flange 14.

The coupling portions 15 may be configured such that no space exists between each adjacent pair of the branch pipe bodies 13.

Each coupling portion 15 may contact the end face 28a of the corresponding case coupling portion 28.

The valve cases 21 and the branch pipe bodies 13 may be joined to each other by a welding method other than vibration welding, e.g. by heat fusion using a heater or laser beam welding.

The valve cases 21 and the branch pipe bodies 13 may be joined with adhesive.

The partition walls 25 of the valve cases 21 may be omitted.

The valve cases 21 that are adjacent to each other in the front-rear direction may be separated from each other.

The present invention may be applied to an internal combustion engine having two cylinders or an internal combustion engine having four or more cylinders.

The present invention may be applied to the intake manifold of a V engine and the intake manifold of a horizontally opposed engine.

What is claimed is:

1. An intake manifold for an internal combustion engine, wherein the intake manifold is connected to a plurality of intake ports of a cylinder head, the intake manifold comprising:
    a plurality of branch pipes, each of which is connected to one of the intake ports and has an intake passage;
    a plurality of valve cases, each of which is provided to one of the branch pipes and connected to the corresponding intake port;
    a plurality of branch pipe bodies, each of which is connected to an upstream end of one of the valve cases;
    a plurality of valves, each of which is provided in one of the valve cases to change a cross-sectional area of the intake passage of the corresponding branch pipe; and
    a coupling portion, which is located between downstream ends of each adjacent pair of the branch pipe bodies to couple the downstream ends to each other upstream of the valve cases.

2. The intake manifold for an internal combustion engine according to claim 1, wherein
    a clearance is formed between each adjacent pair of the branch pipe bodies at a position of the branch pipe bodies that is upstream of parts coupled to the corresponding coupling portion.

3. The intake manifold for an internal combustion engine according to claim 1, wherein
    a case coupling portion is provided between each adjacent pair of the valve cases to couple the valve cases to each other, and
    the case coupling portion is separated from the coupling portion.

4. The intake manifold for an internal combustion engine according to claim 1, wherein
    each valve case has an upstream-side flange at an outer periphery of the upstream end of the valve case, and
    each branch pipe body has a downstream-side flange at an outer periphery of the downstream end of the branch pipe body, wherein
    the upstream-side flange of each valve case is respectively joined to the downstream-side flange of each branch pipe body, and
    the upstream-side and downstream-side flanges are joined together at a position downstream of the coupling portion.

* * * * *